(12) United States Patent
Cheng et al.

(10) Patent No.: US 12,086,967 B2
(45) Date of Patent: Sep. 10, 2024

(54) IMAGE PROCESSING METHOD, PROCESSOR, AND NON-TRANSITORY COMPUTER READABLE STORAGE MEDIUM

(71) Applicant: Realtek Semiconductor Corporation, Hsinchu (TW)

(72) Inventors: Yuhan Cheng, Jiangsu Province (CN); Gang Shen, Jiangsu Province (CN); Dong-Yu He, Jiangsu Province (CN)

(73) Assignee: Realtek Semiconductor Corporation, Hsinchu (TW)

( * ) Notice: Subject to any disclaimer, the term of this patent is extended or adjusted under 35 U.S.C. 154(b) by 388 days.

(21) Appl. No.: 17/646,869

(22) Filed: Jan. 4, 2022

(65) Prior Publication Data
US 2023/0099423 A1    Mar. 30, 2023

(30) Foreign Application Priority Data

Sep. 28, 2021   (CN) .......................... 202111147439.3

(51) Int. Cl.
*G06T 5/90*        (2024.01)
(52) U.S. Cl.
CPC ..................... *G06T 5/90* (2024.01)

(58) Field of Classification Search
CPC .... G06T 5/90; G06T 5/94; G06T 5/20; G09G 5/10; G09G 5/14
See application file for complete search history.

(56) References Cited

U.S. PATENT DOCUMENTS

| | | | |
|---|---|---|---|
| 2020/0068138 A1* | 2/2020 | Gandhi | H04N 23/45 |
| 2020/0228696 A1* | 7/2020 | Liu | H04N 23/741 |

FOREIGN PATENT DOCUMENTS

| | | |
|---|---|---|
| CN | 105323493 A | 2/2016 |
| WO | WO-2020019266 A1 * | 1/2020 |

* cited by examiner

*Primary Examiner* — Syed Haider
(74) *Attorney, Agent, or Firm* — CKC & Partners Co., LLC

(57) ABSTRACT

An image processing method is performed by a processor. The image processing method includes following operations: generating an average brightness value of each of a plurality windows in image data; generating a pixel ratio value according to the image data; generating a weight value of the each of the windows according to the pixel ratio value, a first brightness weight, and a second brightness weight; generating an adjusted brightness value according to the average brightness values of the windows and the weight values of the windows; and performing an auto exposure process according to the adjusted brightness value to generate final image data. The final image data is for a display panel to display.

20 Claims, 4 Drawing Sheets

200

200

IMAGE PROCESSING METHOD, PROCESSOR, AND NON-TRANSITORY COMPUTER READABLE STORAGE MEDIUM

RELATED APPLICATIONS

This application claims priority to Chinese Application Serial Number 202111147439.3, filed Sep. 28, 2021, which is herein incorporated by reference.

BACKGROUND

Technical Field

The present disclosure relates to image processing technology. More particularly, the present disclosure relates to an image processing method, a processor, and a non-transitory computer readable storage medium which can prevent an image from overexposure.

Description of Related Art

With developments of technology, many electronic devices are equipped with image capture devices (e.g., cameras). However, in some scenarios with high contrasts, the image is prone to overexposure. This causes the user to be unable to see the content in the image clearly.

SUMMARY

Some aspects of the present disclosure are to provide an image processing method. The image processing method is performed by a processor. The image processing method includes following operations: generating an average brightness value of each of a plurality windows in image data; generating a pixel ratio value according to the image data, in which the pixel ratio value is a ratio of a first pixel number and a second pixel number, the second pixel number is a quantity of a plurality of pixels, the first pixel number is a quantity of at least one first pixel in the pixels, and a brightness vale of the at least one first pixel is larger than a brightness threshold value; generating a weight value of the each of the windows according to the pixel ratio value, a first brightness weight, and a second brightness weight; generating an adjusted brightness value according to the average brightness values of the windows and the weight values of the windows; and performing an auto exposure process according to the adjusted brightness value to generate final image data. The final image data is for a display panel to display.

Some aspects of the present disclosure are to provide a processor. The processor is configured to generate an average brightness value of each of a plurality windows in image data, generate a pixel ratio value according to the image data, generate a weight value of the each of the windows according to the pixel ratio value, a first brightness weight, and a second brightness weight, generate an adjusted brightness value according to the average brightness values of the windows and the weight values of the windows, and perform an auto exposure process according to the adjusted brightness value to generate final image data. The final image data is for a display panel to display. The pixel ratio value is a ratio of a first pixel number and a second pixel number, the second pixel number is a quantity of a plurality of pixels, the first pixel number is a quantity of at least one first pixel in the pixels, and a brightness vale of the at least one first pixel is larger than a brightness threshold value.

Some aspects of the present disclosure are to provide a non-transitory computer readable storage medium. The non-transitory computer readable storage medium stores one or more computer programs. The one or more computer programs comprise instructions. When a processor executes the instructions, the processor performs following operations: generating an average brightness value of each of a plurality windows in image data; generating a pixel ratio value according to the image data, in which the pixel ratio value is a ratio of a first pixel number and a second pixel number, the second pixel number is a quantity of a plurality of pixels, the first pixel number is a quantity of at least one first pixel in the pixels, and a brightness vale of the at least one first pixel is larger than a brightness threshold value; generating a weight value of the each of the windows according to the pixel ratio value, a first brightness weight, and a second brightness weight; generating an adjusted brightness value according to the average brightness values of the windows and the weight values of the windows; and performing an auto exposure process according to the adjusted brightness value to generate final image data. The final image data is for a display panel to display.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
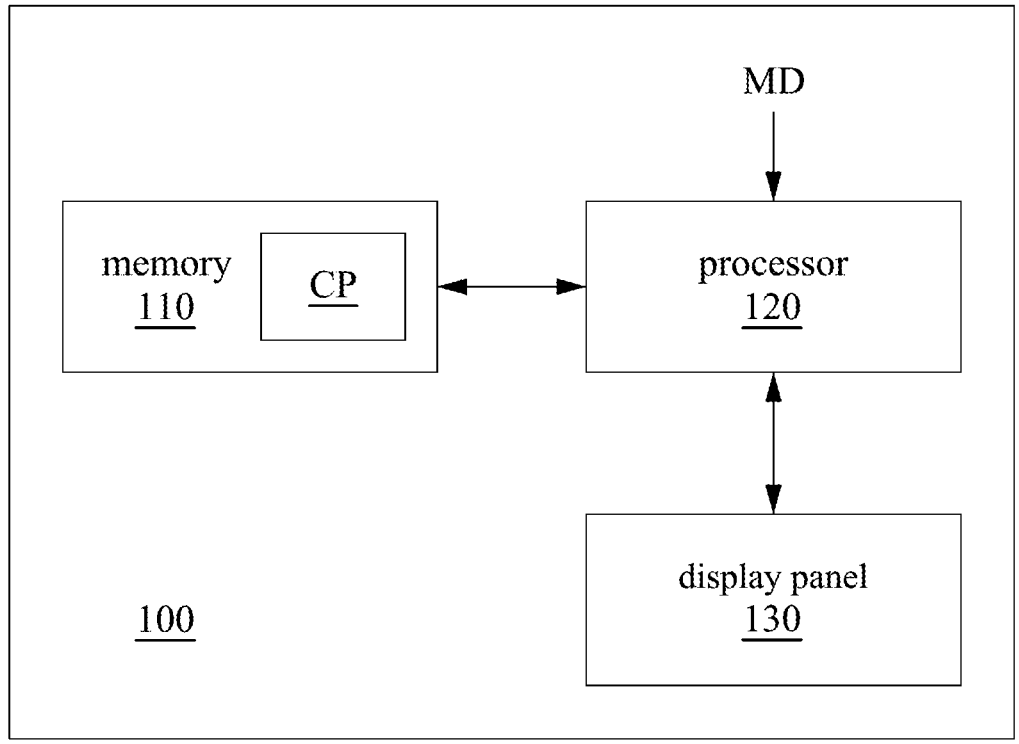
FIG. 1 is a schematic diagram of an electronic device according to some embodiments of the present disclosure.

Reference is made to FIG. 1. FIG. 1 is a schematic diagram of an electronic device 100 according to some embodiments of the present disclosure.

As illustrated in FIG. 1, the electronic device 100 includes a memory 110, a processor 120, and a display panel 130. The processor 120 is coupled to the memory 110 and the display panel 130.

In some embodiments, the memory 110 can be implemented by a non-transitory computer readable storage medium. The non-transitory computer readable storage medium is, for example, a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains. The memory 110 is configured to store one or more computer programs CP including a plurality of instructions. In some embodiments, the processor 120 can be implemented by a central processor or a microprocessor. In some embodiments, the display panel 130 can be implemented by a touch display panel or various display devices.

Figure 2:
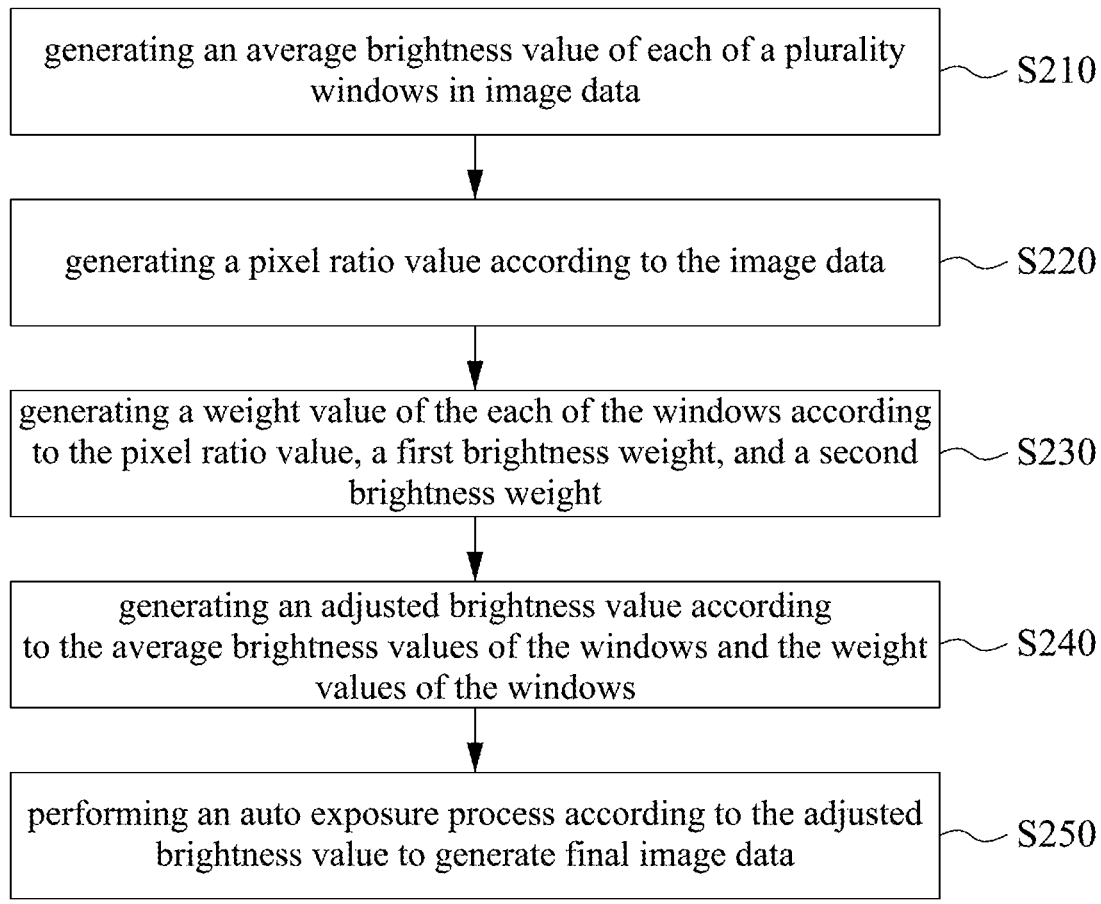
FIG. 2 is a flow diagram of an image processing method according to some embodiments of the present disclosure.

References are made to FIG. 1 and FIG. 2. FIG. 2 is a flow diagram of an image processing method 200 according to some embodiments of the present disclosure. In some embodiments, the image processing method 200 is implemented to the electronic device 100 in FIG. 1, but the present disclosure is not limited thereto. For better understanding, following paragraphs are described with reference to FIG. 1.

In some embodiments, when the computer programs CP in the memory 110 is executed by the processor 120, a computer, or other electronic devices, the image processing method 200 is performed. As illustrated in FIG. 2, the image processing method 200 includes operations S210, S220, S230, S240, and S250.

In operation S210, the processor 120 generates an average brightness value of each of a plurality windows in image data MD. In some embodiments, the image data MD can be generated from a camera or from the memory 110. The processor 120 can divide the image data MD into N×N windows or N×M windows, in which N or M is a positive number which is equal to or larger than 1. The processor 120 can sample each of the windows. For example, each window includes a plurality of pixels, and each pixel corresponds to a brightness value. The processor 120 can sample K sampling pixels from the pixels in one window and generate the average brightness value of this window according to formula (1) below:

$$y_{mean}[i] = \frac{\sum_{j=1}^{K} y_j}{K} \quad (1)$$

in which K is a quantity of the sampling pixels in this window, $y_j$ are brightness value of the sampling pixels in this window, $y_{mean}[i]$ is the average brightness value of this window. In addition, the processor 120 can sort the average brightness values of these windows (e.g., from a smallest average brightness value to a largest average brightness value), and i is an index value of the windows. When an average brightness value of one window is larger, i of the window is larger. On the contrary, when an average brightness value of one window is smaller, i of the window is smaller.

The processor 120 applies the aforementioned principles to all windows to generate the average brightness values of all windows.

When the quantity of the sampling pixels is smaller, the processor 120 can operate faster. When the quantity of the sampling pixels is larger, subsequent calculation result can be more accurate. In some embodiments, operation S210 can be performed without sampling. In other words, all pixels in one window are used for calculating the average brightness values of this window.

In operation S220, the processor 120 generates a pixel ratio value based on the image data MD. In some embodiments, the processor 120 can sample some pixels from the image data MD. It should be understood that the sampling process in operation S220 is independent from the sampling process in operation S210. Then, a histogram process is used to sort the brightness values of the sampling pixels. In some embodiments, the processor 120 can generate the pixel ratio value according to formula (2) below:

$$SR = \frac{\sum_{j=hist\_th}^{hist\_bins} hist_j}{\sum_{j=0}^{hist\_bins} hist_j} \quad (2)$$

in which $$\sum_{j=0}^{hist\_bins} hist_j$$

is a quantity of all sampling pixels in the image data MD, $$\sum_{j=hist\_th}^{hist\_bins} hist_j$$

is a quantity of the pixels whose brightness values are larger than a brightness threshold value, and SR is the pixel ratio value. The brightness threshold value can be designed according to practical applications.

When the pixel ratio value is larger, it represents that the image data MD includes more pixels with higher brightness. On the contrary, when the pixel ratio value is lower, it represents that the image data MD includes less pixels with higher brightness.

Similarly, when there the quantity of the sampling pixels is smaller, the processor 120 can operate faster. When the quantity of the sampling pixels is larger, subsequent calculation result can be more accurate. In some embodiments, operation S220 can be performed without sampling. In other words, all pixels in the image data MD are used for calculating the pixel ratio value.

In operation S230, the processor 120 generates the weight value of each window according to the pixel ratio value generated in operation S220, a low brightness weight, and a high brightness weight. In some embodiments, the processor 120 can generate the weight value of each window according to formula (3) below:

$$weight[i]=(1-SR)\times weight\_low[i]+SR\times weight\_high[i] \quad (3)$$

in which SR is the pixel ratio value generated in operation S220, i is an index value of one window (as described above, when i of one window is larger, the average brightness value of this window is larger), weight_low[i] is the low brightness weight of this window, weight_high[i] is the high brightness weight of this window, and weight[i] is the weight value of this window.

The low brightness weight weight_low[i] and the high brightness weight weight_high[i] of each window can be designed according to practical applications. In some embodiments, when the average brightness value of a first window is larger than that of a second window, the high brightness weight weight_high[i] of the first window can be larger than the high brightness weight weight_high[i] of the second window, and the low brightness weights weight_low[i] of the windows can be equal to each other. In some other embodiments, the low brightness weights weight_low[i] of the windows can be different from each other. For example, when the average brightness value of a first window is larger than that of a second window, the low brightness weight weight_low[i] of the first window can be less than or equal to the low brightness weight weight_low[i] of the second window.

In operation S240, the processor 120 generates the adjusted brightness value of the image data MD according to the average brightness values of the windows and the weight values of the windows. In some embodiments, the processor 120 can utilize a weighted average process to generate the adjusted brightness value of the image data MD according to formula (4) below:

$$Y_{mean} = \frac{\sum_{i=1}^{win\_mum}(y_{mean}[i] \times \text{weight}[i])}{\sum_{i=1}^{win\_mum} \text{weight}[i]} \quad (4)$$

in which $$\sum_{i=1}^{win\_mum} \text{weight}[i]$$

is a sum of the weight values of all windows, $$\sum_{i=1}^{win\_mum}(y_{mean}[i] \times \text{weight}[i])$$

is a sum of products of the brightness values and the weight values of all windows, and $Y_{mean}$ is the adjusted brightness value of the image data MD.

Based on the aforementioned formula (4), the adjusted brightness value is larger than the original average brightness value of the image data MD.

Then, in operation S250, the processor 120 performs an automatic exposure process according to the adjusted brightness value to generate final image data. In some embodiments, the processor 120 can set a target brightness value in advance according to practical applications. As described above, the adjusted brightness value is larger than the original average brightness value of the image data MD. When the adjusted brightness value is larger than the predetermined target brightness value, the automatic exposure process reduces the brightness value of the image data MD according to the target brightness value to generate the final image data. The display panel 130 can display the final image data. Since the automatic exposure process reduces the brightness value of the image data MD, the exposure time and the gain of the image sensor can be reduced to darken the image which is originally overexposed such that the overexposure problem is improved.

In some embodiments, when the contrast of the image data is too high, the brighter window is prone to overexposure. This causes the user to be unable to see the content in the image clearly.

Compared to the aforementioned related approaches, in the present disclosure, the weight value of each window is generated according to the pixel ratio value, the low brightness weight, and the high brightness weight, and the weighted average process is performed on the average brightness values and the weight values of the windows to generate the adjusted brightness value of the image data. Accordingly, the adjusted brightness value is larger than the original average brightness value of the image data. Then, the automatic exposure process is performed based on the adjusted bright value, the exposure time and the gain of the image sensor can be reduced to darken the image which is originally overexposed so as to improve the visibility of images.

Figure 3:
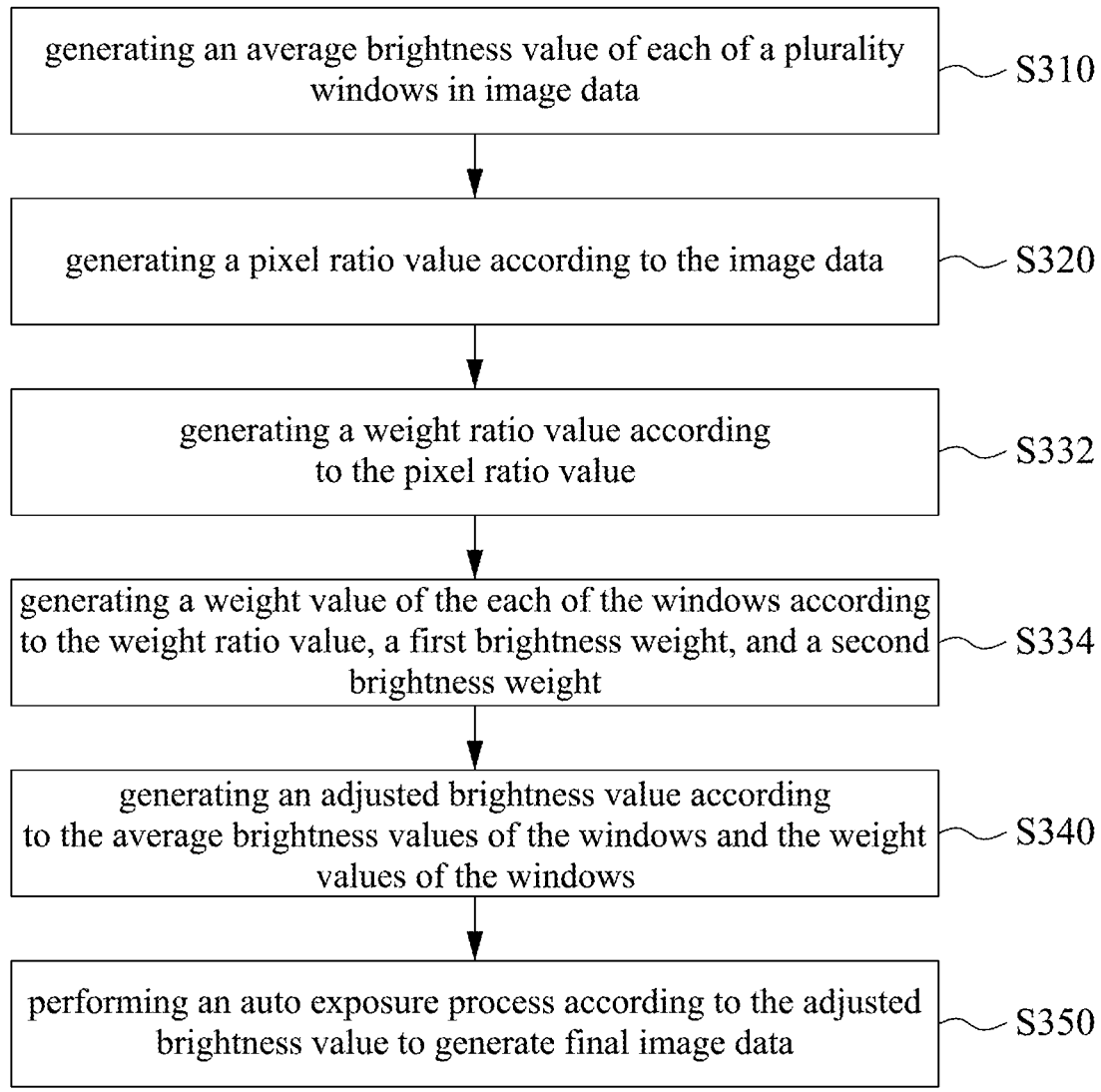
FIG. 3 is a flow diagram of an image processing method according to some embodiments of the present disclosure.

References are made to FIG. 1 and FIG. 3. FIG. 3 is a flow diagram of an image processing method 300 according to some embodiments of the present disclosure. In some embodiments, the image processing method 300 is implemented to the electronic device 100 in FIG. 1, but the present disclosure is not limited thereto. For better understanding, following paragraphs are described with reference to FIG. 1.

In some embodiments, when the computer programs CP in the memory 110 is executed by the processor 120, a computer, or other electronic devices, the image processing method 300 is performed. As illustrated in FIG. 3, the image processing method 300 includes operations S310, S320, S332, S334, S340, and S350.

The operations S310, S320, S340, and S350 in the image processing method 300 are similar to the operations S210, S220, S240, and S250 in the image processing method 200 respectively. Compared to the image processing method 200 in FIG. 2, operation S230 is replaced by operations S332 and S334 in the image processing method 300 in FIG. 3.

In operation S332, the processor 120 can generate a weight ratio value according to the pixel ratio value generated in operation S320 (similar to operation S220 in FIG. 2).

Figure 4:
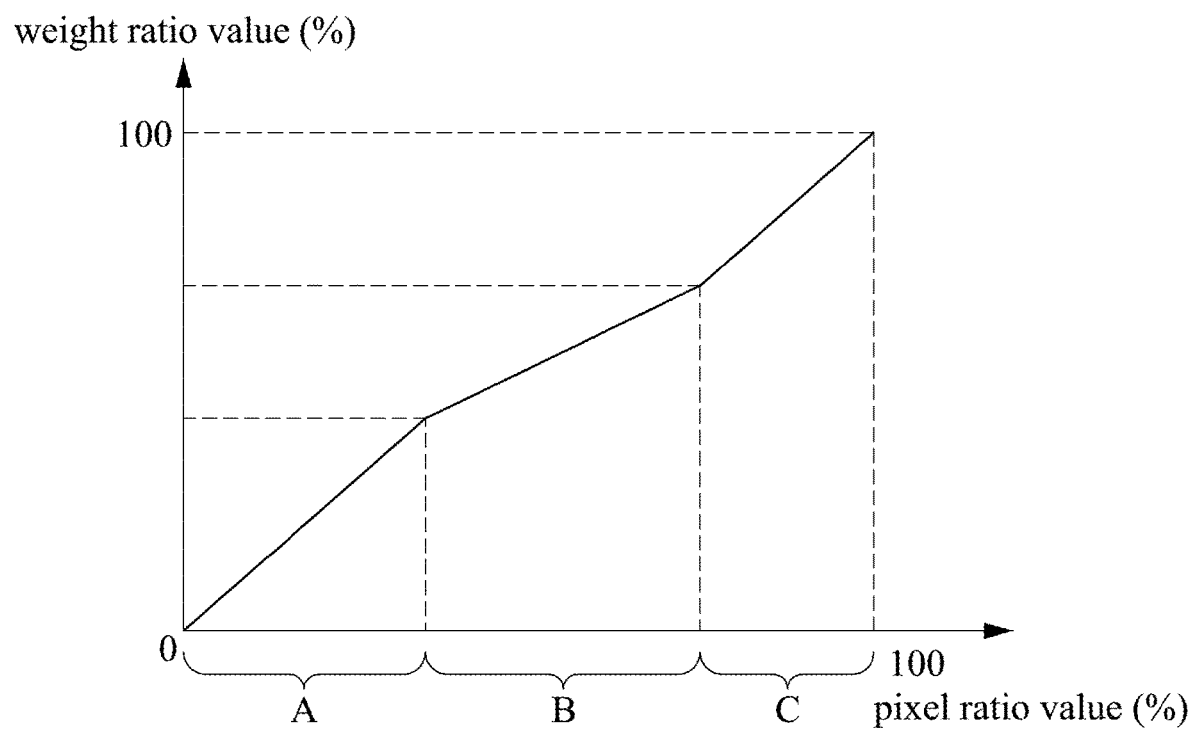
FIG. 4 is a schematic diagram of a relationship between a weight ratio value and a pixel ratio value according to some embodiments of the present disclosure.

Reference is made to FIG. 4. FIG. 4 is a schematic diagram of a relationship between a weight ratio value and a pixel ratio value according to some embodiments of the present disclosure.

In the example in FIG. 4, the relationship between the weight ratio value and the pixel ratio value is a linear function curve. To be more specific, when a pixel ratio value is in a range A or in a range C, the relationship between the weight ratio value and the pixel ratio value is an oblique straight line with a first slope. When a pixel ratio value is in a range B, the relationship between the weight ratio value and the pixel ratio value is an oblique straight line with a second slope, in which the second slope is different from ("smaller" in the example in FIG. 4) the first slope.

However, the present disclosure is not limited to the example in FIG. 4, and the relationship between the weight ratio value and the pixel ratio value can be designed according to practical applications. In other words, various suitable relationships are within the contemplated scopes of the present disclosure.

As illustrated in FIG. 4, one pixel ratio value can correspond to one weight ratio value. Accordingly, the processor 120 can generate the weight ratio value according to the pixel ratio value and the relationship in FIG. 4.

Reference is made to FIG. 3 again. In operation S334, the processor 120 can generate the weight value of each window according to the weight ratio value generated in operation S332, the low brightness weight, and the high brightness weight. In some embodiments, the processor 120 can generate the weight value of each window according to formula (5) below:

weight[i]=(1−WR)×weight_low[i]+WR×weight_high[i] (5)

in which WR is the weight ratio value generated in operation S332, i is the index of one window (as described above, when i of one window is larger, the average brightness value of this window is larger), weight_low[i] is the low brightness weight of this window, weight_high[i] is the high brightness weight of this window, and weight[i] is the weight value of this window.

When the processor 120 generates the weight values of all windows according to formula (5) above, the processor 120 can perform operation S340 (similar to operation S240 in FIG. 2) and operation S350 (similar to operation S250 in FIG. 2) to generate the final image data so as to improve the overexposure problem.

Compared to the image processing method 200 in FIG. 2, the relationship between the weight ratio value and the pixel ratio value can be designed according to practical applications in the image processing method 300 in FIG. 3. Thus, the image processing method 300 has more design flexibility and can be implemented to more scenarios.

As described above, the image processing method, the processor, and the non-transitory computer readable storage medium can prevent images from overexposure to improve the visibility of images.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image processing method, performed by a processor, wherein the image processing method comprises:
   generating an average brightness value of each of a plurality windows in image data;
   generating a pixel ratio value according to the image data, wherein the pixel ratio value is a ratio of a first pixel number and a second pixel number, the second pixel number is a quantity of a plurality of pixels, the first pixel number is a quantity of at least one first pixel in the pixels, and a brightness vale of the at least one first pixel is larger than a brightness threshold value;
   generating a weight value of the each of the windows according to the pixel ratio value, a first brightness weight, and a second brightness weight;
   generating an adjusted brightness value according to the average brightness values of the windows and the weight values of the windows; and
   performing an auto exposure process according to the adjusted brightness value to generate final image data, wherein the final image data is for a display panel to display.

2. The image processing method of claim 1, wherein the average brightness value of a corresponding window in the windows is acquired according to:

$$y_{mean}[i] = \frac{\sum_{j=1}^{K} y_j}{K}$$

wherein K is a quantity of a plurality of sampling pixels in the corresponding window, $y_i$ is a brightness value of a corresponding sampling pixel in the sampling pixels, $y_{mean}[i]$ is the average brightness value of the corresponding window, and i is an index value and corresponds to the corresponding window.

3. The image processing method of claim 1, wherein the weight value of a corresponding window in the windows is acquired according to:

weight[$i$]=(1−SR)×weight_low[$i$]+SR×weight_high[$i$]

wherein SR is the pixel ratio value, weight_low[i] is the first brightness weight of the corresponding window, weight_high[i] is the second brightness weight of the corresponding window, and weight[i] is the weight value of the corresponding window.

4. The image processing method of claim 3, wherein the windows comprise a first window and a second window, wherein when the average brightness value of the second window is larger than that of the first window, the second brightness weight of the second window is larger than that of the first window.

5. The image processing method of claim 4, wherein the first brightness weight of the second window is less than or equal to that of the first window.

6. The image processing method of claim 1, wherein generating the weight value of the each of the windows according to the pixel ratio value, the first brightness weight, and the second brightness weight comprises:
   generating a weight ratio value according to the pixel ratio value; and
   generating the weight value of the each of the windows according to the weight ratio value, the first brightness weight, and the second brightness weight.

7. The image processing method of claim 6, wherein the weight value of a corresponding window in the windows is acquired according to:

weight[$i$]=(1−WR)×weight_low[$i$]+WR×weight_high[$i$]

wherein WR the weight ratio value, weight_low[i] is the first brightness weight of the corresponding window, weight_high[i] is the second brightness weight of the corresponding window, and weight[i] is the weight value of the corresponding window.

8. The image processing method of claim 7, wherein the windows comprise a first window and a second window, wherein when the average brightness value of the second window is larger than that of the first window, the second brightness weight of the second window is larger than that of the first window.

9. The image processing method of claim 8, wherein the first brightness weight of the second window is less than or equal to that of the first window.

10. The image processing method of claim 1, wherein the adjusted brightness value is larger than the average brightness value.

11. A processor configured to execute a plurality of instructions, wherein when the processor executes the plurality of instructions, the processor performs a plurality of operations, wherein the plurality of operations comprise:
   generating an average brightness value of each of a plurality windows in image data;
   generating a pixel ratio value according to the image data;
   generating a weight value of the each of the windows according to the pixel ratio value, a first brightness weight, and a second brightness weight;
   generating an adjusted brightness value according to the average brightness values of the windows and the weight values of the windows; and
   performing an auto exposure process according to the adjusted brightness value to generate final image data, wherein the final image data is for a display panel to display,
   wherein the pixel ratio value is a ratio of a first pixel number and a second pixel number, the second pixel number is a quantity of a plurality of pixels, the first pixel number is a quantity of at least one first pixel in the pixels, and a brightness vale of the at least one first pixel is larger than a brightness threshold value.

12. The processor of claim 11, wherein the average brightness value of a corresponding window in the windows is acquired according to:

$$y_{mean}[i] = \frac{\sum_{j=1}^{K} y_j}{K}$$

wherein K is a quantity of a plurality of sampling pixels in the corresponding window, $y_j$ is a brightness value of a corresponding sampling pixel in the sampling pixels, $y_{mean}[i]$ is the average brightness value of the corresponding window, and i is an index value and corresponds to the corresponding window.

13. The processor of claim 11, wherein generating the weight value of the each of the windows according to the pixel ratio value, the first brightness weight, and the second brightness weight comprises:
generating a weight ratio value according to the pixel ratio value; and
generating the weight value of the each of the windows according to the weight ratio value, the first brightness weight, and the second brightness weight.

14. The processor of claim 13, wherein the weight value of a corresponding window in the windows is acquired according to:

weight[$i$]=(1−WR)×weight_low[$i$]+WR×weight_high[$i$]

wherein WR the weight ratio value, weight_low[i] is the first brightness weight of the corresponding window, weight_high[i] is the second brightness weight of the corresponding window, and weight[i] is the weight value of the corresponding window.

15. The processor of claim 14, wherein the windows comprise a first window and a second window, wherein when the average brightness value of the second window is larger than that of the first window, the second brightness weight of the second window is larger than that of the first window, and the first brightness weight of the second window is less than or equal to that of the first window.

16. A non-transitory computer readable storage medium storing one or more computer programs, wherein the one or more computer programs comprise instructions, wherein when a processor executes the instructions, the processor performs following operations:
generating an average brightness value of each of a plurality windows in image data;
generating a pixel ratio value according to the image data, wherein the pixel ratio value is a ratio of a first pixel number and a second pixel number, the second pixel number is a quantity of a plurality of pixels, the first pixel number is a quantity of at least one first pixel in the pixels, and a brightness vale of the at least one first pixel is larger than a brightness threshold value;
generating a weight value of the each of the windows according to the pixel ratio value, a first brightness weight, and a second brightness weight;
generating an adjusted brightness value according to the average brightness values of the windows and the weight values of the windows; and
performing an auto exposure process according to the adjusted brightness value to generate final image data, wherein the final image data is for a display panel to display.

17. The non-transitory computer readable storage medium of claim 16, wherein the average brightness value of a corresponding window in the windows is acquired according to:

$$y_{mean}[i] = \frac{\sum_{j=1}^{K} y_j}{K}$$

wherein K is a quantity of a plurality of sampling pixels in the corresponding window, $y_j$ is a brightness value of a corresponding sampling pixel in the sampling pixels, $y_{mean}[i]$ is the average brightness value of the corresponding window, and i is an index value and corresponds to the corresponding window.

18. The non-transitory computer readable storage medium of claim 16, wherein generating the weight value of the each of the windows according to the pixel ratio value, the first brightness weight, and the second brightness weight comprises:
generating a weight ratio value according to the pixel ratio value; and
generating the weight value of the each of the windows according to the weight ratio value, the first brightness weight, and the second brightness weight.

19. The non-transitory computer readable storage medium of claim 18, wherein the weight value of a corresponding window in the windows is acquired according to:

weight[$i$]=(1−WR)×weight_low[$i$]+WR×weight_high[$i$]

wherein WR the weight ratio value, weight_low[i] is the first brightness weight of the corresponding window, weight_high[i] is the second brightness weight of the corresponding window, and weight[i] is the weight value of the corresponding window.

20. The non-transitory computer readable storage medium of claim 19, wherein the windows comprise a first window and a second window, wherein when the average brightness value of the second window is larger than that of the first window, the second brightness weight of the second window is larger than that of the first window, and the first brightness weight of the second window is less than or equal to that of the first window.

* * * * *